Patented Sept. 18, 1951

2,568,635

UNITED STATES PATENT OFFICE 2,568,635

PROCESS FOR PREPARING ALPHA-BETA UNSATURATED CARBOXYLIC ACIDS

Jacob Eden Jansen, Akron, and Warren L. Beears, Cleveland, Ohio, assignors to The B. F. Goodrich Company, New York, N. Y., a corporation of New York No Drawing. Application March 22, 1950, Serial No. 151,311

5 Claims. (Cl. 260—526)

This invention relates to an improved process for preparing alpha-beta unsaturated carboxylic acids and pertains more particularly to the preparation of such acids by treating beta-lactone polymers with steam.

It is disclosed in U. S. Patent 2,356,459 to Frederick E. Küng that a wide variety of beta-lactones are readily prepared by reacting ketenes with a carbonyl compound such as an aldehyde or ketone. It is further disclosed in U. S. Patent 2,361,036, to Küng, that polymers of beta-lactones may be pyrolyzed at temperatures of about 150° to 300° C. to give alpha-beta unsaturated carboxylic acids.

It has been found, however, that when this latter process is employed, a considerable quantity of the alpha-beta unsaturated carboxylic acid polymerizes spontaneously, either in the reactor wherein the pyrolytic decomposition is carried out, or during subsequent recovery procedures, even though reduced pressures are utilized throughout the entire process. As a result, the yields of the alpha-beta unsaturated carboxylic acid are greatly reduced and serious operational difficulties are encountered due to the excessive polymer formation in the reactor and in the recovery apparatus and the process is not well suited for use on an industrial scale.

Accordingly, it is an object of the present invention to provide a process for the preparation of alpha-beta unsaturated carboxylic acids by the pyrolysis of beta-lactone polymers wherein the polymerization of the unsaturated acid during the pyrolysis process is reduced to a minimum. Other objects will be apparent hereinafter.

We have now discovered that the above and other objects are accomplished by pyrolyzing the beta-lactone polymer in the presence of superheated steam. By superheated steam is meant water vapor heated to a temperature in excess of 100° C. In this manner polymer formation is almost negligible and extremely high yields of very pure alpha-beta unsaturated carboxylic acids are thereby secured.

The beat-lactone polymers which may be employed in the process of this invention may be defined as polymers of beta-lactones of monocarboxylic acids having at least one unsubstituted hydrogen atom on the alpha carbon atom and containing only unreactive hydrocarbon substituents. Structurally, these beta-lactones possess the formula:

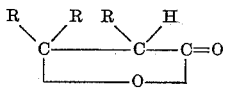

wherein R is hydrogen or an unreactive hydrocarbon radical such as alkyl, aryl, aralkyl, or a cycloalkyl radical. Included in this class of compounds are the beta-lactones of saturated aliphatic monocarboxylic acids containing at least one hydrogen atom on the alpha carbon atom such as beta-propiolactone, beta-butyrolactone, alpha-methyl-beta-propiolactone, beta-valerolactone, alpha-methyl butyrolactone, alpha-ethyl-beta-propiolactone, beta-isovalerolactone, beta-n-caprolactone, alpha - methyl-beta-valerolactone, beta-methyl-beta-ethyl-beta-propiolactone, alpha - methyl - beta - ethyl-beta-propiolactone, alpha - methyl - beta-methyl-beta-propiolactone, alpha-propyl-beta - propiolactone, alpha - butyl-beta - propiolactone, beta - methyl-beta-propyl-beta-propiolactone, and the like; the beta-lactones of aryl substituted carboxylic acids such as beta - phenyl-beta-propiolactone, alpha-phenyl-beta-propiolactone, and other beta-lactones of substituted carboxylic acids such as beta-cyclohexyl-beta-propiolactone, beta-benzyl-beta-propiolactone, alpha-cyclohexyl-beta-propiolactone, and the like. Lactones of acids containing reactive hydrocarbon substituents such as vinyl, alkenyl, divinyl, or acetylenic substituents are preferably not employed because of their great reactivity at the unsaturated bond and hence are not included in the class of lactones herein claimed. The preferred compounds are the beta-lactones containing less than six carbon atoms, particularly the low molecular weight aliphatic lactones, since the difficulty of carrying out the reaction is increased when employing lactones of higher molecular weight.

The polymers of beta-lactones which are pyrolyzed to alpha-beta unsaturated carboxylic acids in accordance with this invention may be prepared in a variety of ways depending upon the particular lactone employed and the relative ease with which it is polymerized. For example, low molecular weight aliphatic lactones which contain at least one hydrogen in the alpha position are polymerized readily simply by the application of heat, pressure, or actinic light or by the action of a number of substances which are termed catalysts. In fact, these lactones polymerize so easily that one of the difficulties experienced in their preparation is to isolate the lactone under conditions which avoid polymerization. The most convenient method of polymerizing the lactone is to heat the lactone or a solution of the lactone in a suitable solvent in the presence of a catalyst. Effective catalysts are, in general, substances which promote condensation reactions including alkaline materials such as potassium carbonate, sodium carbonate, potassium acetate, sodium hydroxide, sodium cyanide, ammonia, pyridine, quinoline, trimethyl amine, triethanol amine, dimethyl aniline and the like; Friedel-Crafts type condensation catalysts such as zinc chloride, aluminum chloride, boron fluoride, iron chloride, stannic chloride or complexes of these compounds with organic compounds such as ethyl ether, ethyl chloride, isopropyl chloride and the like; and other acidic condensation catalysts such as hydrogen chloride and the like. Although some polymerization takes place at ordinary room temperature or even lower temperatures, particularly with acid catalysts such as hydrogen chloride, boron fluoride, ethyl ether and stannic chloride, the polymerization is much more rapid if the lactone is heated in presence of catalysts. Polymerization is also more rapid in the absence of a solvent. The amount of the catalyst should be only very small in proportion to the amount of lactone treated, less than 1% by weight being sufficient.

After the polymerization reaction is initiated by heating the lactone to a temperature ranging from about 50 to 150° C. in the presence of a catalyst, the reaction then becomes exothermic and it is often necessary to provide cooling in order to keep the reaction under control. The length of time necessary to form a polymeric material from the lactone varies with the individual compound used from only a few minutes when beta-propiolactone is heated to 100° C. in the presence of a catalyst to several hours when higher molecular weight lactones are used. Completion of the polymerization is shown by the change in character of the material treated and by cessation of heat evolution.

The polymeric material obtained by polymerization of beta-lactones of the type disclosed hereinabove varies in nature from a thick viscous semi-solid mass to a resinous solid material. These polymers are believed to be linear polymeric esters of a molecular weight varying from about 500 to 2,000 or more having a structure which may be represented as follows:

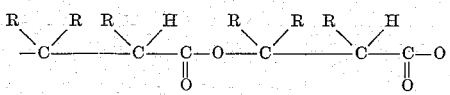

The pyrolysis of beta-lactone polymers in the presence of superheated steam may be accomplished in any desired manner. For example, one preferred method consists in passing a stream of superheated steam at a temperature of from 100° C. to 350° C. and preferably at from 150° C. to 250° C. through the beta-lactone polymer which is contained in a distillation apparatus. An aqueous solution of the alpha-beta unsaturated carboxylic acid is collected in a receiver, the first portions of the distillate being very high in the acid with the concentration of the acid being lowered as the beta-lactone polymer is pyrolyzed. The solutions thus obtained are exceedingly valuable in emulsion polymerizations, since the alpha-beta unsaturated acids obtained in this manner are in a very pure form.

The invention is further illustrated by the following examples.

*Example I*

23.6 pounds of beta-propiolactone polymer are prepared by heating the beta-propiolactone in the presence of 0.5 pounds of potassium carbonate and 0.2 pound of copper acetate.

The polymer thus prepared is placed in a distillation apparatus and superheated steam at a temperature of from 150° C. to 240° C. is directed into the apparatus below the surface of the polymer. The effluent vapors are then passed through a condenser and collected in a receiver. 23.3 pounds (98.5%) of pure acrylic acid, in aqueous solution, are thus obtained.

*Example II*

Example I is repeated except that beta-butyrolactone is substituted for beta-propiolactone. An aqueous solution of crotonic acid, containing nearly a quantitative yield of pure crotonic acid, based on the weight of the polymer pyrolyzed, is obtained.

Moreover, by a similar procedure alpha-methyl acrylic acid is obtained from alpha-methyl beta-propiolactone polymer, and beta,beta-dimethyl acrylic acid is obtained from the polymer of beta-methyl-beta-butyrolactone, to mention but a few of the alpha-beta unsaturated carboxylic acids which can be obtained in pure form from beta-lactone polymers according to the method of the present invention.

Although the invention has been described in relation to preferred embodiments, numerous modifications will be apparent to those skilled in the art. Accordingly, it is not intended that the invention be limited except by the spirit and scope of the appended claims.

We claim:

1. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises carrying out the pyrolysis in the presence of superheated steam.

2. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises carrying out the pyrolysis in the presence of superheated steam at a temperature of from 150° C. to 350° C.

3. In a method for preparing acrylic acid by pyrolyzing a polymer of beta-propiolactone, the improvement which comprises carrying out the pyrolysis in the presence of superheated steam.

4. In a method for preparing acrylic acid by pyrolyzing a polymer of beta-propiolactone, the improvement which comprises carrying out the pyrolysis in the presence of superheated steam maintained at a temperature of from 150° C. to 250° C.

5. In a method for preparing acrylic acid by pyrolyzing a polymer of beta-propiolactone, the improvement which comprises carrying out the pyrolysis in the presence of superheated steam and recovering the acrylic acid in the form of an aqueous solution.

JACOB EDEN JANSEN.
WARREN L. BEEARS.

REFERENCES CITED

The following references are of record in the file of this patent:

UNITED STATES PATENTS

| Number | Name | Date |
|---|---|---|
| 2,361,036 | Kung | Oct. 24, 1944 |
| 2,484,067 | Boese | Oct. 11, 1949 |

OTHER REFERENCES

Gresham et al. J. Am. Chem. Soc., vol. 70 pp. 998–999 (1948).